United States Patent [19]

Scott

[11] Patent Number: 5,735,925
[45] Date of Patent: Apr. 7, 1998

[54] METHOD AND APPARATUS FOR DELIVERING A CASED GLASS STREAM

[75] Inventor: Garrett L. Scott, Toledo, Ohio

[73] Assignee: Owens-Brockway Glass Container Inc., Toledo, Ohio

[21] Appl. No.: 716,918

[22] Filed: Sep. 20, 1996

[51] Int. Cl.⁶ .................................. C03B 5/16; C03B 7/00
[52] U.S. Cl. .................................. 65/121; 65/126; 65/128; 65/325; 65/326; 65/327; 65/355; 65/356
[58] Field of Search .............................. 65/121, 122, 126, 65/128, 135.1, 145, 146, 325, 326, 327, 355, 356

[56] References Cited

U.S. PATENT DOCUMENTS

| | | | |
|---|---|---|---|
| 1,529,947 | 3/1925 | Freese | 65/121 |
| 1,622,666 | 3/1927 | Peiler | |
| 1,828,217 | 10/1931 | Barker, Jr. | |
| 1,853,843 | 4/1932 | Bates et al. | 65/326 |
| 1,946,879 | 2/1934 | Peltier | 65/121 |
| 1,963,763 | 6/1934 | Smith | 65/326 |
| 2,052,269 | 8/1936 | Woods | 65/145 |
| 2,186,718 | 1/1940 | Ferguson | 65/128 |
| 3,015,842 | 1/1962 | Stalego | |
| 3,078,695 | 2/1963 | Kozak et al. | |
| 3,160,492 | 12/1964 | Chapman et al. | 65/128 |
| 3,288,583 | 11/1966 | Sheldon | |
| 3,291,584 | 12/1966 | Sheldon | |
| 3,508,904 | 4/1970 | Keefer | |
| 3,554,726 | 1/1971 | Daly | |
| 3,558,296 | 1/1971 | Bracken | 65/128 |
| 3,580,713 | 5/1971 | Schirm et al. | |
| 3,582,299 | 6/1971 | Gladwell, Jr. | |
| 3,607,184 | 9/1971 | Williams | |
| 3,625,671 | 12/1971 | Schirm et al. | |
| 3,817,736 | 6/1974 | Kojo et al. | 65/128 |
| 3,899,315 | 8/1975 | Siegmund | |
| 3,960,530 | 6/1976 | Iyengar | |
| 4,023,953 | 5/1977 | Megles, Jr. et al. | |
| 4,133,664 | 1/1979 | Aulich et al. | |
| 4,217,123 | 8/1980 | Titchmarsh | |
| 4,247,320 | 1/1981 | Bansal et al. | |
| 4,299,609 | 11/1981 | Aulich et al. | |
| 4,305,747 | 12/1981 | Kirkman et al. | |
| 4,340,160 | 7/1982 | van Geel et al. | |
| 4,351,664 | 9/1982 | Bansal | 65/135.1 |
| 4,381,932 | 5/1983 | Olson et al. | |
| 4,457,771 | 7/1984 | Ambrogi | |
| 4,466,818 | 8/1984 | Brongersman | |
| 4,740,401 | 4/1988 | Barkau et al. | |
| 4,875,917 | 10/1989 | Lentz | |
| 4,897,100 | 1/1990 | Nice | |
| 5,204,120 | 4/1993 | Hirschberger | |

*Primary Examiner*—Steven P. Griffin

[57] ABSTRACT

Apparatus for forming a cased glass stream having an inner core glass surrounded by an outer casing glass includes a spout for receiving core glass from a first source and delivering such glass through a first orifice. A second orifice is vertically spaced beneath and aligned with the first orifice, and is surrounded by an annular chamber that communicates with the second orifice through the gap between the first and second orifices. A tube delivers casing glass from a second source to the annular chamber in such a way that glass flows by gravity from the first and second sources through the orifices to form the cased glass stream. The core glass delivery spout includes a reservoir for receiving and holding the core glass, and having at least one lower opening of a first diameter. An orifice ring is positioned beneath the reservoir, and has at least one opening of second diameter less than the first diameter aligned with the first opening and forming the first orifice. A collar of uniform inside diameter equal to the first diameter extends from the first opening to the orifice ring, and thereby spaces the reservoir from the orifice ring so as to increase hydrostatic head pressure on glass flowing from the reservoir through the first orifice. The core glass reservoir is surrounded by a metal casing, and the casing glass delivery tube extends through a notch in the sidewall of the core glass casing. An air-cooled liner controls heat transfer from the casing glass delivery tube to the core glass reservoir.

34 Claims, 3 Drawing Sheets

METHOD AND APPARATUS FOR DELIVERING A CASED GLASS STREAM

The present invention is directed to delivery of a glass stream for forming glass charges for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed to provide a cased glass stream for forming glassware having layered wall segments. U.S. application Ser. Nos. 08/374,371 and 08/374,372 (respectively refiled as application Ser. Nos. 08/787,061 and 08/782,552) disclose techniques for delivering such a cased glass stream in which core glass from a first source is delivered through a first orifice. A second orifice is vertically spaced beneath and aligned with the first orifice, and is surrounded by an annular chamber that communicates with the second orifice through the gap between the first and second orifices. A heated tube delivers casing glass from a second glass source to the annular chamber that surrounds the second orifice. Glass flows by force of gravity from the first and second sources through the first and second orifices in such a way that a cased glass stream emerges from the second orifice. This cased glass stream may be sheared by conventional techniques to form individual cased glass gobs for delivery to conventional individual section glassware forming machines.

Although the techniques disclosed in the noted patent applications address and overcome problems theretofore extant in the art, further improvements remain desirable. For example, it has been found desirable to increase the gravitational force that forces the core glass through the orifices so as to increase flow rate and uniformity of the cased glass stream. Furthermore, the heated tube that delivers the casing glass to the annular chamber passes closely adjacent to the core glass reservoir, and it has been found desirable to control heat exchange between the casing glass delivery tube and the core glass reservoir and glass delivery elements. It is therefore a general object of the present invention to provide a method and apparatus for delivering a cased glass stream of the described character in which hydrostatic head pressure on the core glass stream is increased without deleteriously affecting core glass delivery, and in which heating of the core glass stream is closely controlled for optimum performance and reduced leakage.

Apparatus for forming a cased glass stream having an inner core glass surrounded by an outer casing glass includes a spout for receiving core glass from a first source and delivering such glass through a first orifice. A second orifice is vertically spaced beneath and aligned with the first orifice, and is surrounded by an annular chamber that communicates with the second orifice through the gap between the first and second orifices. A tube delivers casing glass from a second source to the annular chamber in such a way that glass flows by gravity from the first and second sources through the orifices to form the cased glass stream. In accordance with the present invention, the core glass delivery spout includes a reservoir for receiving and holding the core glass, and having at least one lower opening of first diameter. An orifice ring is positioned beneath the reservoir, and has at least one opening of second diameter less than the first diameter aligned with the first opening and forming the first orifice. A collar of uniform inside diameter equal to the first diameter extends from the first opening to the orifice ring, and thereby spaces the reservoir from the orifice ring so as to increase hydrostatic head pressure on glass flowing from the reservoir through the first orifice.

The collar is externally surrounded by an electrical resistance-heating element for heating the collar and thereby promoting flow of glass from the reservoir through the collar, particularly during initiation of glass flow. The collar in the preferred embodiment of the invention is of ceramic composition, and has an inner liner of metal such as platinum for preventing leakage of glass through the collar in the event of fracture. The collar and the reservoir form an abutment joint surrounding the opening at the bottom of the reservoir, and this joint is cooled to control leakage of glass through the joint. The joint cooling mechanism preferably comprises a segmented hollow band through which cooling air flows.

In accordance with another aspect of the present invention, the core glass reservoir is surrounded by a protective casing. A vertically oriented notch or pocket is formed in this casing for receiving the heated casing glass delivery tube. An air-cooled metal band heat exchanger is positioned in the casing notch between the casing and the tube to control heat transfer between the tube and the casing, and thus between the casing glass delivery tube and the core glass reservoir.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
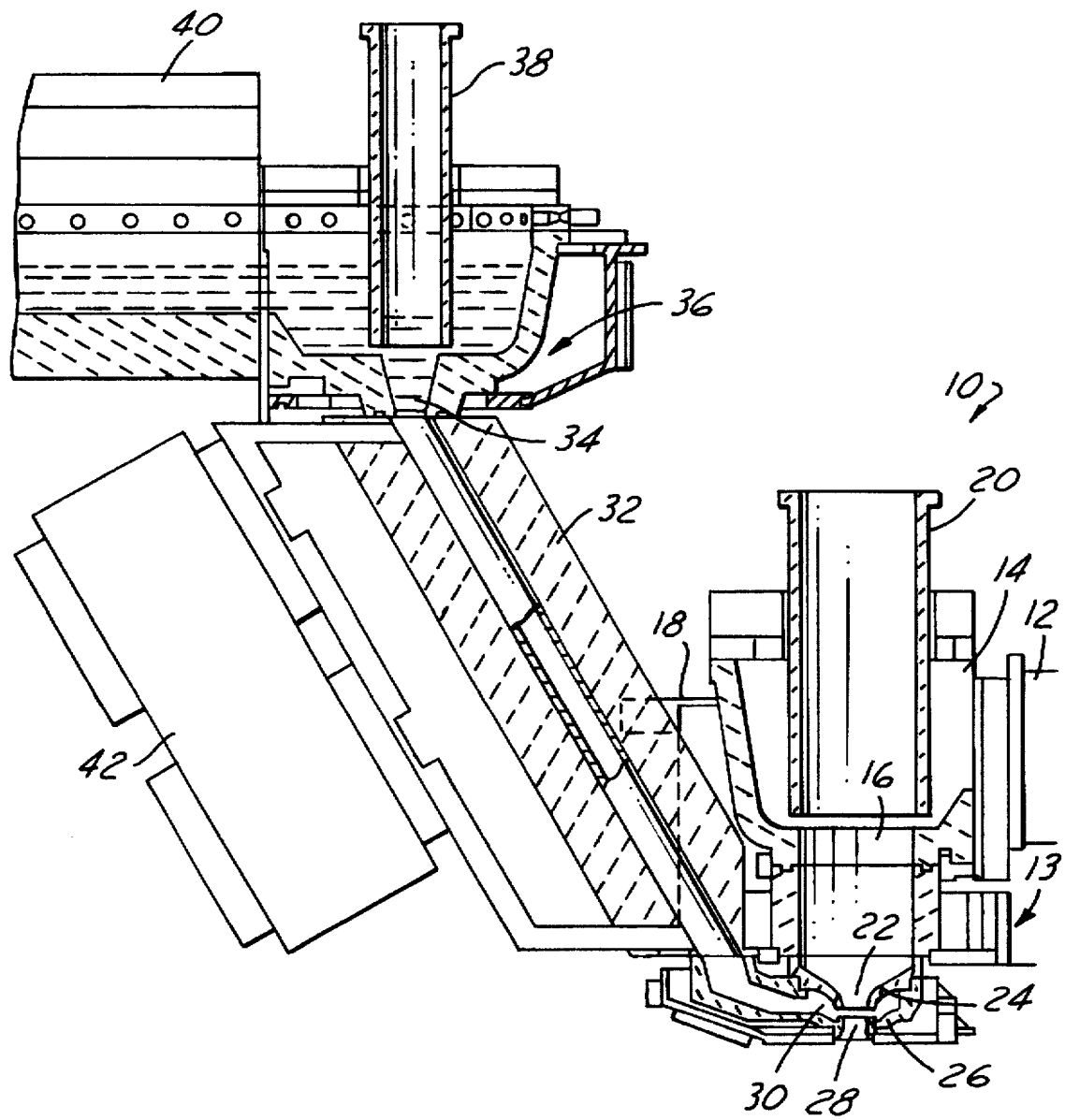
FIG. 1 is a fragmentary elevational schematic diagram of a glass delivery system in accordance with a presently preferred embodiment of the invention.

FIG. 1 illustrates a system 10 for delivering a stream of cased glass. A first forehearth 12 delivers core glass to a reservoir or bowl 14 that has at least one opening 16 (usually several openings) at the lower end thereof. Reservoir 14 is surrounded by a protective casing 18, preferably constructed of non-magnetic metal such as stainless steel. A tube 20 controls delivery of core glass from reservoir 14 through opening 16 to and through a first orifice 22 carried by an upper orifice ring 24 beneath reservoir 14. A lower orifice ring 26 carries a second orifice 28 positioned beneath orifice 22 and axially aligned therewith. Orifice 28 is surrounded by an annular chamber 30 formed between orifice rings 22, 26. Chamber 30 communicates with orifice 28 by means of a lateral space or gap between orifices 22, 28. Annular chamber 30 is coupled by a delivery tube 32 to the opening 34 at the lower end of a casing glass spout 36. Spout 36 includes a delivery control tube 38, and is coupled to a casing glass forehearth 40. Delivery tube 32 is resistance heated by control electronics 42 for maintaining flow of casing glass to chamber 30. To the extent thus far described, system 10 in FIG. 1 is essentially the same as disclosed in above-noted U.S. application Serial Nos. 08/374,371 and 08/374,372 (respectively refiled as Ser. No. 08/787,061 and 08/787,061. The former of such applications is directed in particular to construction of casing glass delivery tube 32, while the latter of such applications is directed in particular to construction of orifice rings 24, 26. The disclosures of such applications, both of which are assigned to the assignee hereof, are incorporated herein by reference for purposes of background.

Figure 2:
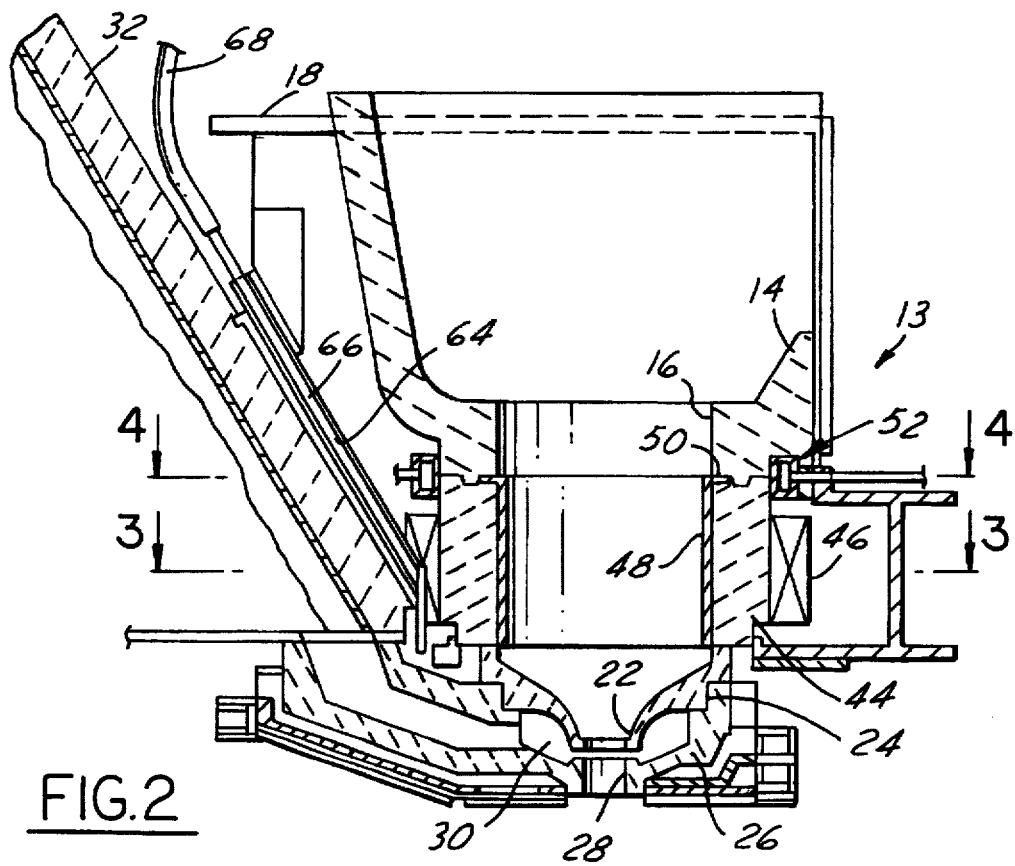
FIG. 2 is a fragmentary sectional view on an enlarged scale of a portion of the delivery system illustrated in FIG. 1.
Figure 3:
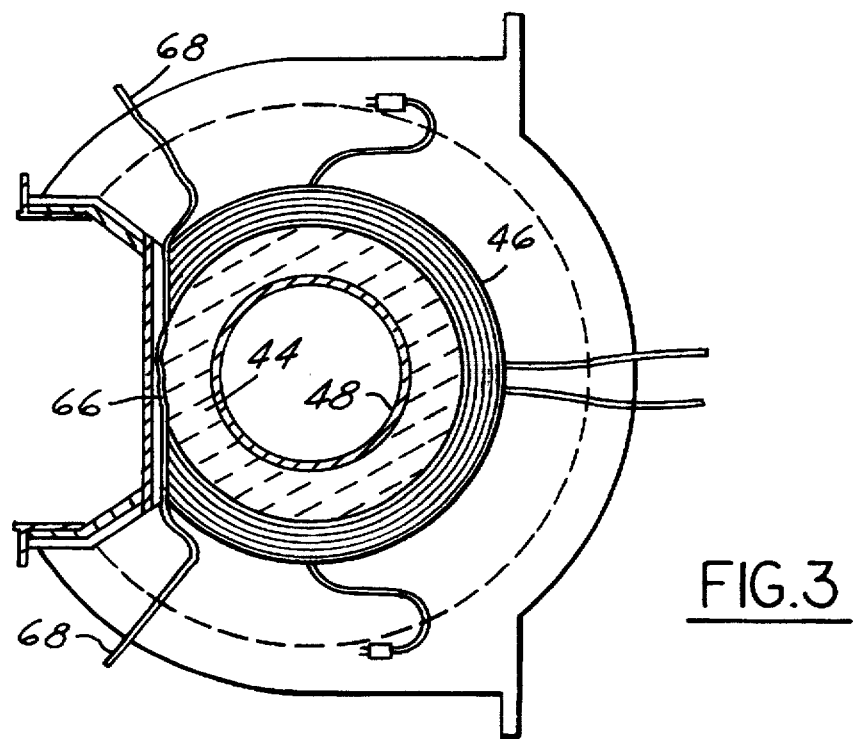
FIG. 3 is a sectional view taken substantially along the line 3—3 in FIG. 2.
Figure 4:
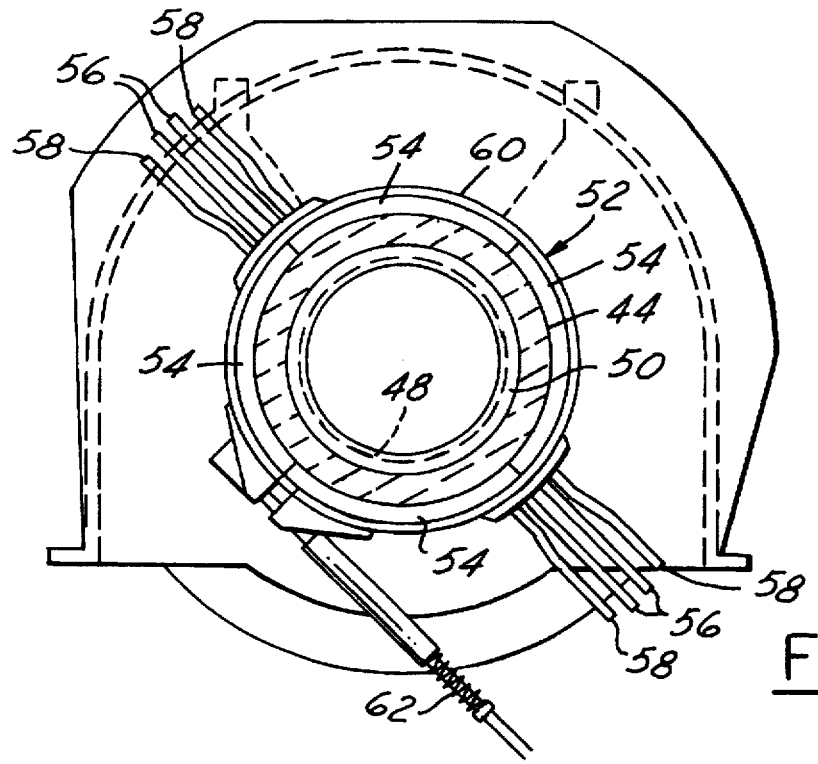
FIG. 4 is a sectional view taken substantially along the line 4—4 in FIG. 2.
Figure 6:
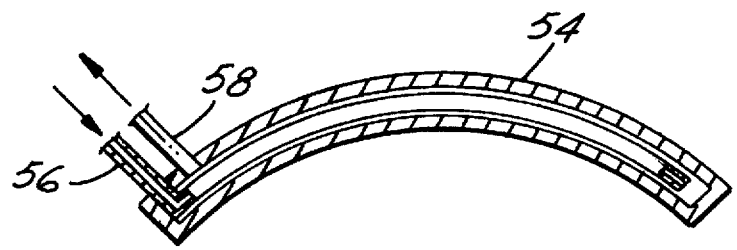
FIG. 6 is a sectional view of one of the cooling band elements illustrated in FIG. 5.
Figure 5:
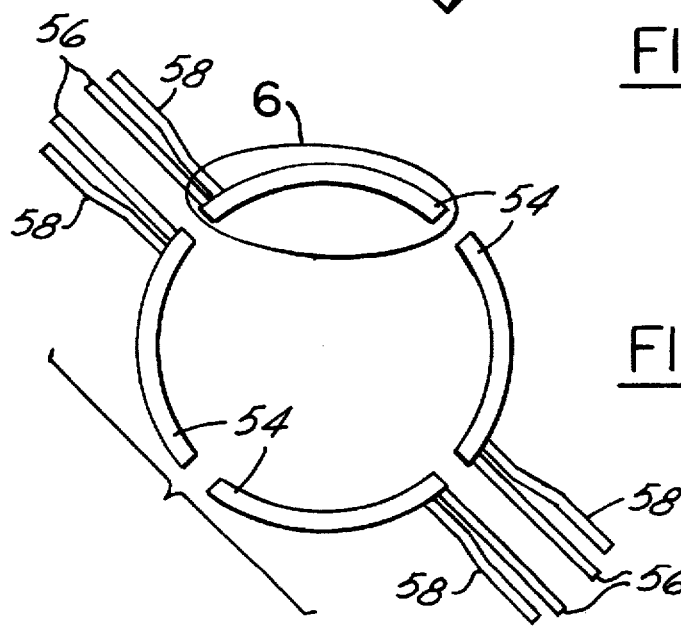
FIG. 5 is an exploded plan view of the reservoir/collar cooling assembly illustrated in FIG. 4.

FIG. 2 illustrates core glass spout 13 in greater detail. An extension collar 44 extends from the lower end of reservoir 14 to the upper end of orifice ring 24. Collar 44 has a uniform inside diameter equal to the diameter of opening 16 in reservoir 14 and greater than the inside diameter of orifice 22 in orifice ring 24. Collar 44 is preferably of ceramic composition, as are reservoir bowl 14 and orifice ring 24. Collar 44 thus serves to elevate reservoir 14 with respect to orifice ring 24 so as to increase hydrostatic pressure on the core glass that flows from reservoir 14 through orifice 22, and thereby increase both core glass and casing glass flow rates. Collar 44 is surrounded by an electrical resistance heating element 46 (FIGS. 2 and 3) to boost heating of collar 44 from that caused by conduction from gas burner assemblies at reservoir 14 and lower orifice ring 26. Such heating of collar 44 helps promote core glass flow, particularly during startup. A cylindrical sheath 48 of platinum or other corrosion-resistant metal lines the inner surface of collar 44, having an outwardly projecting circumferential flange 50 captured between the lower end of reservoir bowl 14 and the upper end of collar 44. Platinum sheath 48 prevents leakage of glass through extension collar 44 in the event of cracking or fracture of the latter. A lip may also be formed at the lower end of sheath 48 to help reenforce the sheath and hold it in position over collar 44.

Inasmuch as reservoir 14 and collar 44 comprise different ceramic castings, glass can leak at the abutment joint between the lower end of the reservoir bowl and the upper end of the collar. Externally applied heat to collar 44 can aggravate this leakage, and prevent slowing and hardening of leaking glass by devitrification. In order to cool this joint enough to cause glass devitrification and thereby arrest leakage, an air-cooled metal band 52 (FIGS. 2 and 4–6) radially outwardly surrounds this joint. Band 52 comprises four identical hollow arcuate segments 54. Each segment has an inlet 56 which interiorily extends from one end into the hollow segment to adjacent the opposing end, and from which air can flow along the inner wall surfaces of each segment to an air outlet 58. The four segments 54 are clamped in end-adjacent position surrounding the reservoir/ collar joint by means of a clamp ring 60. Clamp ring 60 is circumferentially compressed by means of a coil spring 62, which accommodates expansion of clamp ring 60 and cooling band 52 caused by thermal expansion of collar 44 and reservoir 14. Joint temperature is monitored and cooling air is routed through band 52 so as to maintain the temperature of the joint sufficiently low so as to cause devitrification of glass leakage, while sufficiently high to insure that devitrified glass crystals do not form within the main glass stream.

Delivery tube 32 extends downwardly from casing glass spout 36 closely adjacent to and intersecting core glass reservoir casing 18. In order to accommodate passage of delivery tube 32, a pocket or notch 64 is formed in the sidewall of casing 18. This notch or pocket allows delivery tube 32 to nest closer to orifice ring 24 and orifice 22. An air-jacketed metal liner plate 66 is disposed within notch 64 between delivery tube 32 and the material of casing 18. Air flow is directed through plate 66 to maintain plate 66 and casing 18 at a temperature low enough to reduce glass leakage while hot enough to minimize thermal disturbances to glass flow either through orifice 22 or delivery tube 32. Cooling air is delivered to plate 66 by means of inlet tubes 68.

I claim:

1. In a method of forming a glass stream comprising a first inner layer and a second outer layer which includes providing a spout having a first generally vertical orifice, delivering molten glass from a first source through said first orifice, and delivering glass from a second source such that the glass from said second source provides an outer layer about the glass from the first source, the improvement comprising:

providing a resistance heated tube assembly, having an inlet end and an outlet end through which the glass flows from said second glass source for said outer layer, providing an electrically heated collar below said spout between said spout and said first orifice, providing a second orifice in vertically spaced aligned relation below said first orifice, providing an annular chamber around said second orifice, positioning said tube assembly such that the inlet end receives glass from said second source and the outlet end delivers glass to said annular chamber, delivering glass from said first source through said first orifice to and through said second orifice, delivering glass from said second source from the outlet end of said resistance heated tube assembly to said annular chamber and between said first and second orifices such that said glass from said second source provides an outer layer to said glass from said first source, and glass flowing through said second orifice comprises said first inner layer and said second outer layer, and providing a casing about said electrically heated collar and providing a generally vertical notch in said casing into which said outlet end of said tube assembly is positioned.

2. The method set forth in claim 1 including providing cooling means adjacent to said notch.

3. The method set forth in claim 2 wherein said step of providing cooling means comprises providing an air cooled heat exchanger between said casing and said tube assembly within said notch, and delivering cooling air through said heat exchanger.

4. The method set forth in claim 1 wherein said step of providing said casing comprises making said casing of non-magnetic metal.

5. The method set forth in claim 1 wherein said step of providing said casing comprises making said casing of stainless steel.

6. In a method of forming a glass stream comprising a first inner layer and a second outer layer which includes providing a spout having a first generally vertical orifice, delivering molten glass from a first source through said first orifice, and delivering glass from a second source such that the glass from said second source provides an outer layer about the glass from the first source, the improvement comprising:

providing a resistance heated tube assembly having an inlet end and an outlet end through which the glass flows from said second glass source for said outer layer, providing a second orifice in vertically spaced aligned relation below said first orifice, providing an annular chamber around said second orifice, positioning said tube assembly such that the inlet end receives glass from said second source and the outlet end delivers glass to said annular chamber, delivering glass from said first source through said first orifice to and through said second orifice, delivering glass from said second source from the outlet end of said resistance heated tube assembly to said annular chamber and between said first and second orifices such that said glass from said second source provides an outer layer to said glass from said first source, and glass flowing through said second orifice comprises said first inner layer and said second outer layer, and providing a casing about said first source and providing a generally vertical notch in said casing into which said outlet end of said tube assembly is positioned.

7. The method set forth in claim 6 including providing cooling means adjacent said notch.

8. The method set forth in claim 7 wherein said step of providing cooling means comprises providing an air cooled heat exchanger between said casing and said tube assembly within said notch, and delivering cooling air through said heat exchanger.

9. The method set forth in claim 6 wherein said step of providing said casing comprises making said casing of non-magnetic metal.

10. The method set forth in claim 6 wherein said step of providing a casing comprises making said casing of stainless steel.

11. In an apparatus for forming a glass stream comprising a first inner layer and a second outer layer which includes a spout having a first generally vertical orifice, means for delivering molten glass from a first source through said first orifice, and means for delivering glass from a second source such that the glass from said second source provides an outer layer about the glass from the first source, the improvement comprising:

a resistance heated tube assembly having an inlet end and an outlet end through which the glass flows from said second source for the outer layer, an electrically heated collar below said spout between said spout and said first orifice, a second orifice in vertically spaced relation below said first orifice, an annular chamber around said second orifice, said tube assembly being positioned such that the inlet end receives glass from said second source and the outlet end delivers glass to said annular chamber, such that glass from said first source is delivered through said spout, said first orifice and said second orifice in sequence, and glass from said second source flows from the outlet end of said resistance heated tube assembly to said annular chamber and between said first and second orifices such that said glass from said second source provides an outer layer to said glass from said first source, and glass flowing through said second orifice comprises said first inner layer and said second outer layer, and a casing about said electrically heated collar, said casing including a generally vertical notch in said casing in which said outlet end of said resistance heated tube assembly is disposed.

12. The apparatus set forth in claim 11 including cooling means adjacent said notch.

13. The apparatus set forth in claim 12 wherein said cooling means comprises an air cooled heat exchanger in said notch between said casing and said tube assembly and means for delivering cooling air through said heat exchanger.

14. The apparatus set forth in claim 11 wherein said casing is made of non-magnetic metal.

15. The apparatus set forth in claim 11 wherein said casing is made of stainless steel.

16. In an apparatus, for forming a glass stream comprising a first inner layer and a second outer layer which includes a spout having a first generally vertical orifice, means for delivering molten glass from a first source through said orifice, and means for delivering glass from a second source such that the glass from said second source provides an outer layer about the glass from the first source, the improvement wherein said means for delivering glass from said second source comprises:

a resistance heated tube assembly having an inlet end and an outlet end through which the glass flows from said second source for the second outer layer, said tube assembly being positioned such that the inlet end receives glass from said second source, and a casing surrounding said means for delivering glass from said first source and having a generally vertical notch in which said outlet end of said resistance heated tube assembly is disposed.

17. The apparatus set forth in claim 16 including cooling means adjacent said notch.

18. The apparatus set forth in claim 17 wherein said cooling means comprises a an air-jacketed liner plate between said casing and said tube assembly and means for delivering cooling air through said liner plate.

19. The apparatus set forth in claim 16 wherein said casing is made of non-magnetic metal.

20. The apparatus set forth in claim 16 wherein said casing is made of stainless steel.

21. In an apparatus for forming a cased glass stream having an inner core glass surrounded by an outer casing glass, said apparatus including a spout for receiving core glass for a first source and delivering such glass through a first orifice, means forming a second orifice vertically spaced beneath and aligned with said first orifice with an annular chamber surrounding said second orifice and communicating with said second orifice through a gap between said first and second orifices, and means for delivering casing glass from a second source to said annular chamber such that glass flows by gravity through said orifices from said first and second sources to form said cased glass stream, the improvement in which said spout comprises:

a reservoir for receiving and holding said core glass and having at least one lower opening of a first diameter, an orifice ring positioned beneath said reservoir and having at least one opening of second diameter less than said first diameter aligned with said at least one lower opening of said first diameter and forming said first orifice, and a collar of uniform inside diameter equal to said first diameter extending from said at least one lower opening to said orifice ring and thereby spacing said reservoir from said orifice ring so as to increase hydrostatic pressure on glass at said first orifice from said reservoir, said collar and said reservoir forming an abutment joint surrounding said at least one lower opening, and said apparatus further comprising means for cooling said joint so as to control leakage of glass through said joint, said cooling means comprising a hollow band surrounding said joint and means for delivering cooling air to said band, said band being circumferentially segmented around said collar for accommodating thermal expansion of said collar, clamp means for holding said band in place around said joint, and spring means for maintaining clamping pressure on segments of said band while accommodating expansion as a result of heating of said reservoir and collar.

22. The apparatus set forth in claim 21 further comprising heating means disposed externally around said collar for heating said collar and thereby promoting flow of glass from said reservoir through said collar.

23. The apparatus set forth in claim 22 wherein said heating means comprises electrical heating means.

24. The apparatus set forth in claim 22 wherein said collar is of ceramic composition.

25. The apparatus set forth in claim 24 wherein said collar has a metal liner extending from said at least one lower opening to said orifice ring for preventing leakage of glass through said collar.

26. The apparatus set forth in claim 21 wherein said spout further comprises a casing surrounding said reservoir, said casing having a notch through which extends said means for delivering casing glass from said second source to said annular chamber.

27. In an apparatus for forming a cased glass stream having an inner core glass surrounded by an outer casing glass, said apparatus including a spout for receiving core glass for a first source and delivering such glass through a first orifice, means forming a second orifice vertically spaced beneath and aligned with said first orifice with an annular chamber surrounding said second orifice and communicating with said second orifice through a gap between said first and second orifices, and means for delivering casing glass from a second source to said annular chamber such that glass flows by gravity through said orifices from said first and second sources to form said cased glass stream, the improvement in which said spout comprises:

a reservoir for receiving and holding said core glass and having at least one lower opening of a first diameter, an orifice ring positioned beneath said reservoir and having at least one opening of a second diameter less than said first diameter aligned with said at least one lower opening of said first diameter and forming said first orifice, a collar of uniform inside diameter equal to said first diameter extending from said at least one lower opening to said orifice ring and thereby spacing said reservoir from said orifice ring so as to increase hydrostatic pressure on glass at said first orifice from said reservoir, and a casing surrounding said reservoir, said casing having a notch through which extends said means for delivering casing glass from said second source to said annular chamber.

28. The apparatus set forth in claim 27 wherein said collar and said reservoir form an abutment joint surrounding said at least one lower opening, and wherein said apparatus further comprises means for cooling said joint so as to control leakage of glass through said joint.

29. The apparatus set forth in claim 28 wherein said cooling means comprises a hollow band surrounding said joint and means for delivering cooling air to said band.

30. The apparatus set forth in claim 29 wherein said band is circumferentially segmented around said collar for accommodating thermal expansion of said collar.

31. The apparatus set forth in claim 30 further comprising clamp means for holding said band in place around said joint.

32. The apparatus set forth in claim 31 wherein said clamp means includes spring means for maintaining clamping pressure on segments of said band while accommodating expansion as a result of heating of said reservoir and collar.

33. The apparatus set forth in claim 27 wherein said means for delivering casing glass comprises a heated tube, and wherein said apparatus further comprises means in said notch for controlling heat transfer between said tube and said casing.

34. The apparatus set forth in claim 33 wherein said means in said notch comprises an air cooled heat exchanger.

* * * * *